(12) United States Patent
Alam et al.

(10) Patent No.: US 11,979,315 B2
(45) Date of Patent: May 7, 2024

(54) INFORMATION CENTRIC NETWORK INTERWORKING TECHNIQUES

(71) Applicant: Intel Corporation, Santa Clara, CA (US)

(72) Inventors: S. M. Iftekharul Alam, Hillsboro, OR (US); Satish Chandra Jha, Hillsboro, OR (US); Kuilin Clark Chen, Hillsboro, OR (US); Yi Zhang, Portland, OR (US); Venkatesan Nallampatti Ekambaram, Hillsboro, OR (US); Ned M. Smith, Beaverton, OR (US); Ravikumar Balakrishnan, Hillsboro, OR (US); Gabriel Arrobo Vidal, Hillsboro, OR (US); Kathiravetpillai Sivanesan, Portland, OR (US); Stepan Karpenko, Hillsboro, OR (US); Jeffrey Christopher Sedayao, San Jose, CA (US); Srikathyayani Srikanteswara, Portland, OR (US); Eve M. Schooler, Portola Valley, CA (US); Zongrui Ding, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 524 days.

(21) Appl. No.: 16/456,687

(22) Filed: Jun. 28, 2019

(65) Prior Publication Data
US 2019/0327169 A1    Oct. 24, 2019

(51) Int. Cl.
*H04L 69/14*    (2022.01)
*H04L 45/24*    (2022.01)
(Continued)

(52) U.S. Cl.
CPC ............ *H04L 45/306* (2013.01); *H04L 45/24* (2013.01); *H04L 47/12* (2013.01); *H04L 69/14* (2013.01)

(58) Field of Classification Search
CPC ....... H04L 45/24; H04L 45/306; H04L 47/12; H04L 69/14
(Continued)

(56) References Cited

U.S. PATENT DOCUMENTS

| 2014/0328190 A1* | 11/2014 | Lord | H04W 24/08 370/252 |
| 2015/0195764 A1* | 7/2015 | Chung | H04L 67/327 370/328 |

(Continued)

OTHER PUBLICATIONS

"A query language for your API", [Online]. Retrieved from the Internet: URL: https: graphql.org , (Accessed on Dec. 5, 2019), 9 pgs.
(Continued)

*Primary Examiner* — Karen C Tang
(74) *Attorney, Agent, or Firm* — Schwegman Lundberg & Woessner, P.A.

(57) ABSTRACT

Systems and techniques for information centric network (ICN) interworking are described herein. For example, a request may be received at a convergence layer of a node. Here, the request originates from an application on the node. A network protocol, from several available to the node, may be determined to transmit the request. The node then transmits the request via the selected network protocol.

24 Claims, 8 Drawing Sheets

(51) Int. Cl.
*H04L 45/302* (2022.01)
*H04L 47/12* (2022.01)

(58) Field of Classification Search
USPC .................................................. 709/217, 231
See application file for complete search history.

(56) References Cited

U.S. PATENT DOCUMENTS

| | | | |
|---|---|---|---|
| 2015/0281079 A1* | 10/2015 | Fan | H04L 12/6418 |
| | | | 370/392 |
| 2018/0007176 A1* | 1/2018 | Suthar | H04L 67/327 |
| 2018/0227390 A1* | 8/2018 | Reznik | H04L 67/327 |
| 2018/0241679 A1* | 8/2018 | Muscariello | H04L 47/125 |
| 2018/0242218 A1* | 8/2018 | Muscariello | H04W 40/02 |
| 2018/0316645 A1* | 11/2018 | Dong | H04W 4/70 |
| 2019/0199628 A1* | 6/2019 | Amin | H04L 45/74 |
| 2019/0306133 A1* | 10/2019 | Allan | G06F 9/45558 |

OTHER PUBLICATIONS

Rahman, A, "Deployment Considerations for Information-Centric Networking (ICN)", [Online]. Retrieved from the Internet: URL: https: tools.ietf.org id draft-irtf-icnrg-deployment-guidelines-01. html, (2018), 22 pgs.

Suther, P, "Deploying information centric networking in LTE mobile networks", IEEE Asia Pacific Conference on Wireless and Mobile (APWiMob), Bandung doi: 10.1109 APWiMob.2016.7811432, (2016), 130-136.

* cited by examiner

INFORMATION CENTRIC NETWORK INTERWORKING TECHNIQUES

TECHNICAL FIELD

Embodiments described herein generally relate to computer networking and more specifically to information centric network (ICN) interworking techniques.

BACKGROUND

ICN is an umbrella term for a new networking paradigm in which information itself is named and requested from the network instead of hosts (e.g., machines that provide information). To get content, a device requests named content from the network itself. The content request may be called an interest and transmitted via an interest packet. As the interest packet traverses network devices (e.g., routers), a record of the interest is kept. When a device that has content matching the name in the interest is encountered, that device may send a data packet in response to the interest packet. Typically, the data packet is tracked back through the network to the source by following the traces of the interest left in the network devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
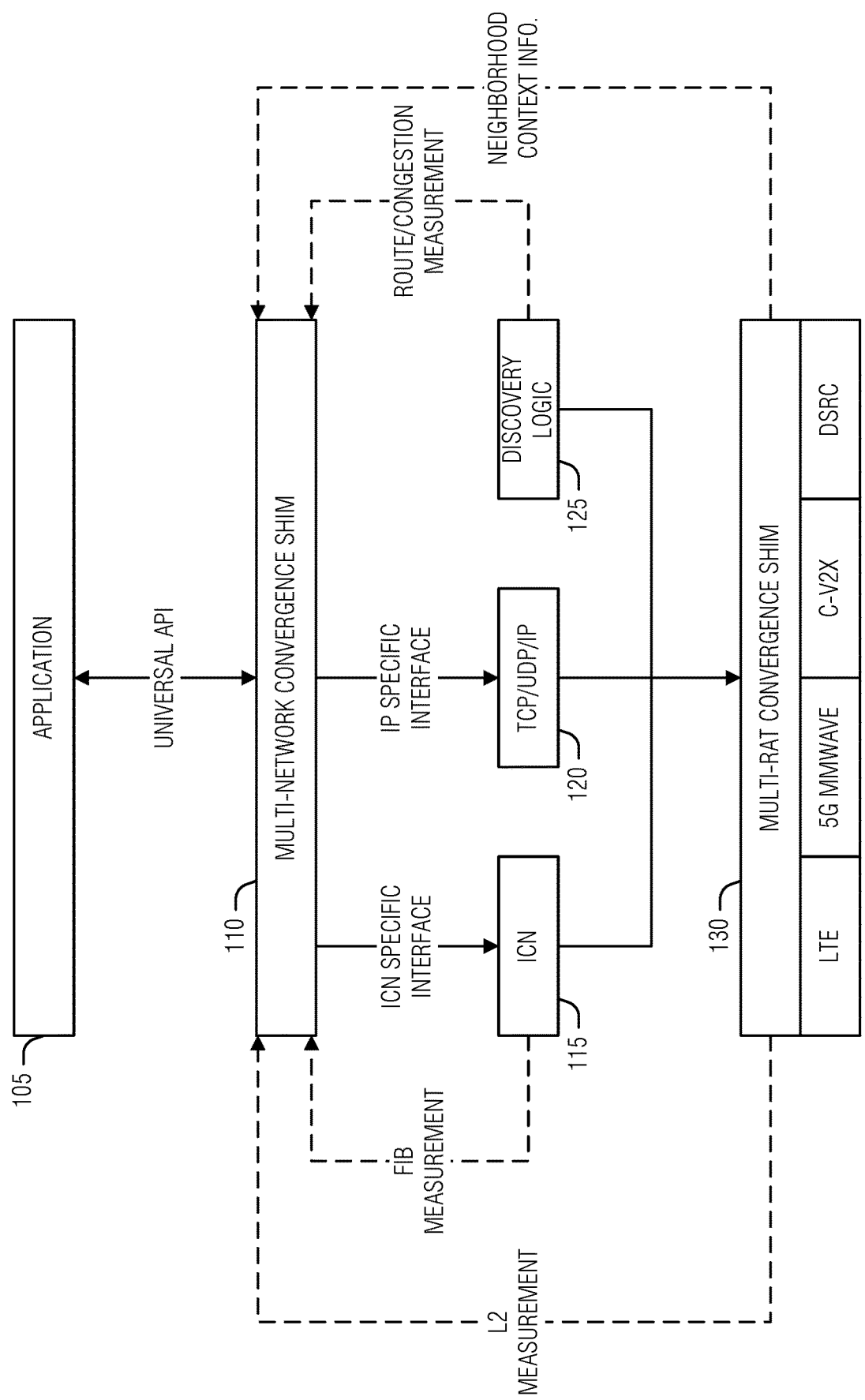
FIG. 1 illustrates an example of component interactions for ICN coexistence with other networking paradigms, according to an embodiment.

Internet Protocol (IP) addressed based networking is currently the dominant networking layer protocol for existing applications, ICN is appearing as a strong contender for efficient content delivery, especially within a multi-radio access technology (RAT) dynamic network. Addressed based networking may be efficient when source and destination nodes are known a priori, but ICN has in-built support for subscriber (e.g., consumer, requestor, etc.) and publisher (e.g., content provider, provider, etc.) mobility and enables fetching content from nodes that may never be known to a requestor at the time of a request.

The benefits of ICN may not be realized unless coexistence with address based networks enables a smooth transition between the two technologies. Some interworking proposals include ICN-as-an-overlay over IP, ICN-as-an-underlay for IP, translation between IP and ICN on an edge node, among others. Due to the already established infrastructure for IP and availability of IP-based popular applications, co-existence of native IP and ICN is one of the most promising deployment choices. Such deployment takes advantage of both protocols for a given scenario. For example, in a dynamic vehicular network, a vehicle may have multiple network interfaces—such as cellular vehicle-to-everything (C-V2X), dedicated short range communications (DSRC), Long-Term Evolution (LTE), fifth generation cellular (5G), millimeter wave (mmWave), etc.—and may download baseline HD map tiles from a fixed Road Side Unit (RSU) via IP over 5G or fetch tiles of an HD map containing road dynamics from nearby vehicles via ICN over a C-V2X network. This, however, involves a universal interface between the application layer and underlying networking layer protocols (e.g., IP and ICN). Furthermore, selecting a networking layer protocol and radio access technology for a given scenario may involve non-trivial challenges, such as discovering environmental context (e.g., static or dynamic, dense or sparse deployment, etc.), routing or congestion performance metrics or measurements from ICN/IP layers, communication link quality of available RAT interfaces, among others.

Some suggestions for mixed ICN and IP networking delegate the complexities to an application layer, which generally chooses one of these technologies to use. Also, generally, these techniques do not leverage knowledge of the different underlying network protocols to actively select which would be best for any given workload. Thus, the efficiencies from either networking layer may be lost.

To address the issues noted above, an intelligent multi-network convergence shim may be used to interface between the application layer and the underlying ICN and IP network layers. This shim makes various network layers transparent to application layer by providing a universal API to send and receive requests and responses. In an example, the shim also collects contextual information from a neighbor discovery component and measurement information from various components of the network protocol stack (e.g., layer 1 or layer 2), such as ICN and IP routing metrics. This information then may be fed to a network layer selector that determines whether a single layer or both layers should be used to propagate a given application request. In an example, the shim provides hints for the underlying network layer to, for example, choose one of several the available RATs for a transmission. As used herein, a hint is information that may or may not be used by the receiving entity. Thus, while the shim may hint that a 5G cellular connection be used, the information may be ignored if, for example, the 5G connection is experiencing connection problems. Also, in an example, an application layer request may be split into several by the shim, the responses to which may be merged together by the shim to give the application a simple and seamless interaction with the request and response exchange. These features, working together, provide a simple and efficient combination of ICN and IP networks for applications that leverages the unique benefits of each network technology. Additional details and examples are discussed below.

As noted above, ICN may improve the distribution of content and other data. However, there are some situations in which data distribution through an ICN should be restricted. These situations may include distributing data within a vehicle only to the occupants of the vehicle. For example, multiplayer game content for passengers, augmented reality (AR) or virtual reality (VR) entertainment, music, a call or collaborative business session, etc. Further, privacy regulations around the world may require (or strongly encourage) hosting data within a defined geographic area (e.g., country). This may also implicate some event-based data gathering, such as data gathered around a vehicle wreck (e.g., within twenty meters of an accident), generally need not be shared farther without authorization. Also, digital rights management (DRM) may require that content be accessed within a specific geographic region, specific country, or specific area like within a home.

ICN networks typically distribute data to all those who are interested (e.g., author an interest packet), relying on cryptography to restrict access. That is, ICN implementations generally restrict access to data through encryption, rather than controlling how data packets are forwarded throughout the network. This does not, however, natively enable location-based access. It may be possible to distribute keys to receivers in a designated geographic area. Alternatively, hop restrictions—e.g., the number of network nodes through which an interest may pass—may be employed to restrict availability in ICN routing, or to use localhost specifications (e.g., only one hop away for distributing data). The ubiquitous witness evidence solicitation (UWES) protocol restricts data to a geographic area based on a consumer request parameter using scoped interest packets. Some other techniques may restrict forwarding to specific geographic areas (e.g., a restriction placed by producer).

There are some issues with current attempts to limit ICN distribution to a geographic area. For example, while distribution may be restricted to receivers in a geographic area, a receiver with interest could later move out of the restricted area and still receive data. Further, a data producer may be mobile—such as a car, truck, or bus—and move in and out of various geographies, which would make it difficult to manage because keys may have to be handed off, potentially very frequently. Using hop-count restrictions may be an unreliable mechanism for geography, because there may be multiple hops in a specified location or there may be only a single hop for consumers inside and outside of an area—this may vary depending on RATs used. In addition, there is no standardized ICN framework for declaring a geographic forwarding policy such as "only forward from sensors within half a meter radius" or "only forward within the European Union." There is a paucity of ideas to location and possibly other forwarding restrictions in a general way for both data consumers and producers.

To address these geographic limitation issues present in ICN, the forwarding information base (FIB) or pending interest table (PIT) of ICN may be modified to handle an optional geographic constraint field in both interest and data packets. Further, the ICN may integrate network measurements to implement general constrained forwarding policies and location (e.g., geographical) policies.

The geographic limitation in ICN may be combined with the IP and ICN integration described herein to maximize network reach and efficiency while maintaining control over the data. In both cases, a general and application agnostic mechanism is offered that increases the utility of ICN for use in mobile networks, data center networks, or content distribution by providing a general mechanism for internetworking and constraint based forwarding and geographic based control. Again, additional details and examples are provided below.

FIG. 1 illustrates an example of component interactions for ICN coexistence, according to an embodiment. The illustrated example considers a dynamic network (e.g., decentralized vehicular network) where the illustrated node within the network has two network layer protocols, ICN 115 and an address based protocol 120 (referred to hereinafter as IP although other protocols may be used). In an example, as illustrated, the node also has multi-RAT capability, such as LTE, 5G mmWave, C-V2X, DSRC, etc.

The node is configured to provide a universal interface to an application layer 105 from networking layer standpoint. The node is also configured to consider environmental context and network conditions when selecting one of the network layer protocols (e.g., ICN 115 or IP 120) or selecting a transmission medium (e.g., a RAT). Because various RATs may have discontinuous coverage, RAT switching may be used to ensure transmission as coverage changes in the dynamic ad hoc network.

To help the node in accomplishing the tasks above, a multi-network convergence shim 110 between the application layer 105 and the network layers is used to provide applications with a universal application programming interface (API) to send requests and receive responses. In an example, API may use a query language, such as GraphQL, or representational state transfer (REST). Some examples below use GraphQL, although any technique may be employed. In an example, the API includes an interface to enable the application layer 105 to provide hints (e.g., to the ICN layer 115 or the IP layer 120) about potential request splitting (e.g., turning a single interest into several along a specific dimension or attribute of the interest). In an example, the API includes an interface to support adding a host name or address and preferred port number to connect to the node.

In an example, the multi-network convergence shim 110 includes a network selector component. The network selector component is configured to collect contextual information from a neighborhood discovery component 125 (e.g., V2X discovery) or networking layer and RAT-specific measurement information (e.g., routing cost via a select RAT, congestion level, link quality, etc.). In an example, the network selector component is configured to accept an application layer splitting hint, preferred host address, and the context information into consideration before determining which networking layer, or layers, to use to transmit a request. In an example, the network selector function may use a learning-based decision engine, such as an artificial neural network, to integrate these data points and select an out-bound network protocol to use.

In an example, the multi-network shim 110 may also implement a congestion control mechanism that buffers the application layer 105 packets and provides rate control over the ICN 115 and IP 120 networks. In an example, the congestion control mechanism has a retransmission facility. In an example, the retransmission facility is limited to ICN packets. In an example, upon receiving packets from either network layer, the multi-network convergence shim 110 is configured to reassemble out-of-order packets received over the ICN 115 and IP 120 networks. In an example, the multi-network convergence shim 110 is configured to set timeouts for packets and perform packet dropping as necessary.

Once the networking layers or layers are selected for a given transmission, the multi-network convergence shim 110 is configured to create network layer specific transport. Thus, when the ICN 115 is selected, the multi-network convergence shim 110 is configured to create an interest packet. If IP were selected, then a socket may be created.

In an example, multi-network convergence shim 110 is arranged to consider application security requirements when creating a network specific transport element. Thus, for example, the shim 110 may create a secure socket layer (SSL) connection in an IP selection in response to application layer 105 security signaling.

In an example, where an IP socket may expect a secure REST protocol—such as HTTPS, CoAPS or OSCORE—but ICN layer 115 doesn't have a corresponding equivalent, the discovery component 125 is configured to detect this condition and instruct the multi-network convergence shim 110 to request a suitable credential (e.g., certificate, symmetric secret, raw asymmetric key) to use with a TLS or IP-SEC VPN to secure the IP transport path. The credential may be the same as is used by the ICN layer 115 or in addition to it. The latter enables secure tunneling or in the case of a secure group communication scheme, enables a network of approved IP routers and gateway nodes to participate in handling ICN content while excluding those not authorized.

In an example, the shim 110 may also signal a RAT preference to the network layers; such a preference having come from the application layer 105, a configuration of the node, etc. For example, the multi-network convergence shim 110 may select either the mmWave or LTE in a relatively static scenario (e.g., the network node is not moving with respect to other relevant network nodes) to download large amount of data.

In an example, the multi-network convergence shim 110 is arranged to create uniquely named interest or data packets. Here, contextual information may be extracted from an application layer request and integrated into named ICN packet, for example.

In an example, if a request is split across the ICN 115 and IP 120 protocols, it may be important to identify the multiple packets as part of the same application layer request to merge response data before passing the response to the application layer 105. Here, the multi-network convergence shim 115 may attach meta data (e.g., derived from a request sequence number, a system-defined application ID, a local node ID, all three, or other data) to a request and corresponding response messages. The attachment of meta data is consistent with ICN 115 or IP 120 specific packet processing mechanisms. For example, a convergence layer header may be added for IP 120 and a similar tag or field may be included in an interest packet for ICN 115.

Collection of context information or measurement reports from various layers of the various network technologies may be collected via interfaces. For example, the discovery component 125 may be used in dynamic ad hoc networks. Consider, in a vehicular network, the discovery component 125 may periodically share the node's ID, location, or speed information with other vehicles. Hence, information from the discovery component 125 may be used to understand network dynamics. Similarly, routing or congestion measurements from the ICN 115 or IP 120 components may provide information about the cost to fetch content via a specific RAT. RAT (e.g., network layers one and two) metrics may provide more real-time information to understand communication link quality and interference level. Such information may be collected through cross-layer interaction. In an example, a higher layer (such as the network layer (e.g., ICN 115) or convergence shim 110) may periodically send measurement probe packets to estimate network performance metrics.

The node may include a multi-RAT convergence shim 130. The multi-RAT convergence shim 130 is configured to select and control one of the RAT technologies chosen by an ICN forwarding strategy or source IP address prefix specific to that RAT. In an example, the multi-RAT convergence shim 130 is configured to provide the RAT metrics to higher layers.

In the context of the discussion above, consider HD map downloading in a vehicular dynamic network as a use case. Here, the application layer 105 API (implemented in the multi-network convergence shim 110) is implemented using GraphQL: Example 1 illustrates a request from the application layer 105 to download HD map tiles ranging from 1 to 100 for both a dynamic and a static layer. The request includes hints to split along the attribute 'types'. The request also provides instruction to connect to particular host and port if the IP network layer 120 is selected.

Example 1:

```
{
    map.tiles{
        tile_range: [1, 100]
        types: [dynamic, baseline]
        splitting_hints: types
        preferred_host: wcr.intel.com
        preferred_port: 80
    }
}
```

Example 2 illustrates a request where the application layer includes hints to split along a tile range attribute and provides no information about preferred hosts.

Example 2:

```
{
    map.tiles{
        tile_range: [1, 100]
        types: [dynamic, baseline]
        splitting_hints: tile_range
    }
}
```

Upon reception of the request shown in example 1, the network selector component of the multi-network convergence shim 110 may select both the ICN 115 and the IP 120 layers based on the context and measurement information it has collected. The multi-network convergence shim 110 maintains some state information for each request—such as, sequence number, segment number, splitting flag, etc. An example of request splitting over ICN 115 and IP 120 may include, in the case of ICN 115, creating an interest packet with the name /map/tiles/tile_range=[1,100]/type="dynamic". The translation from GraphQL to an ICN interest packet is straightforward as GraphQL has a well-defined structure. A digest may be calculated from the sequence number, local node ID, and system-defined application ID. In addition to a segment number, this digest may be attached to the interest packet as meta data.

An example of request splitting over ICN 115 and IP 120 may include, in the case of IP 120, a native TCP socket or Hypertext Transfer Protocol (HTTP) may be used to connect to the preferred port of the host listed in application layer request. Like translation from GraphQL to an ICN name, the content of the TCP/IP packet may be generated such that the IP-based server application understands the request properly. An example IP-based application packet header may contain the following information: "map"|"tiles"|range_from |range_to| type|digest| segment_num. Here the values of range_from and range_to are 1 and 100 whereas the value of the type field is baseline.

In an example, the digest contains a unique sequence generated by hashing the sequence number, local node ID, and system-defined application ID. Note that, attaching the digest and segment number to an IP application packet is optional when the multi-network convergence shim 110 stores this information locally, mapping them to a corresponding IP flow (e.g., as specified by source IP, destination IP, source port, destination port).

Figure 2:
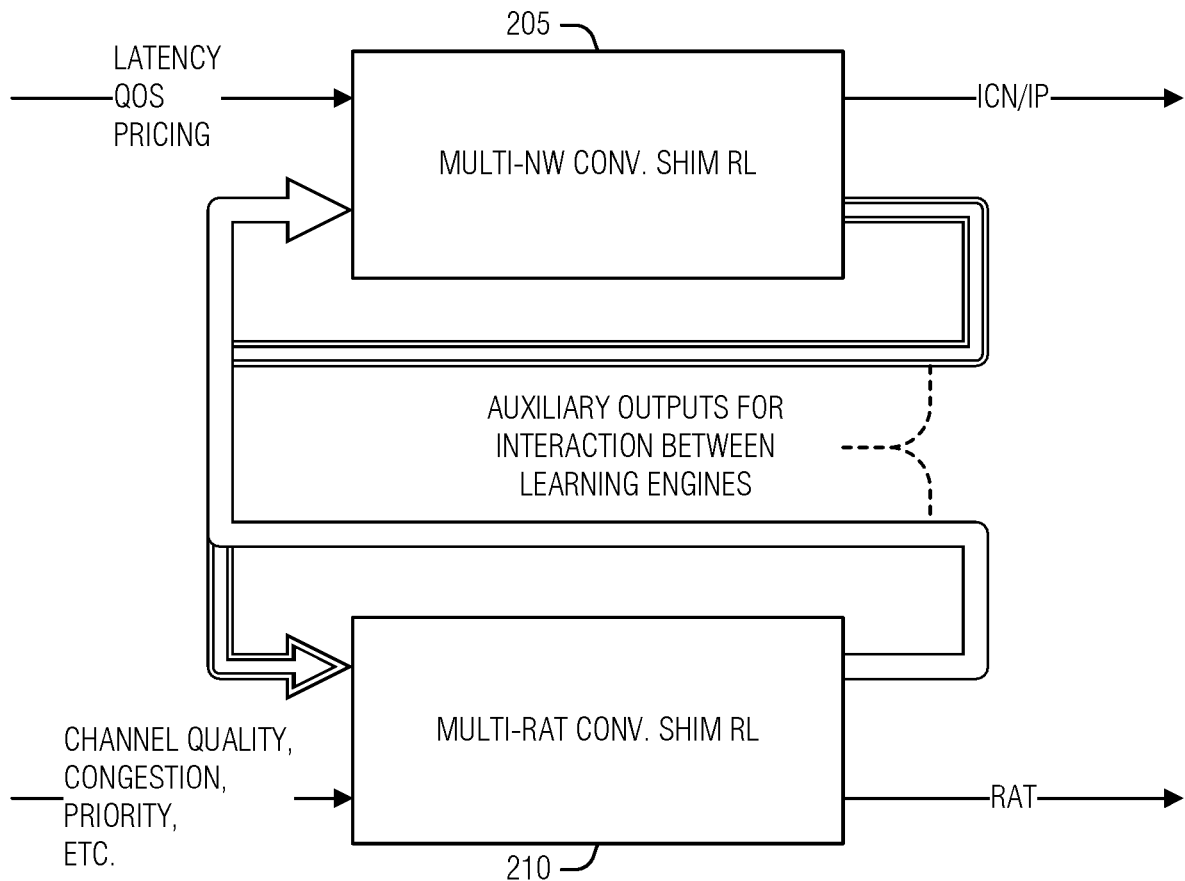
FIG. 2 is an example of a system for machine selected protocols, according to an embodiment.

FIG. 2 is an example of a system for machine selected protocols, according to an embodiment. Here, the intelligent machine approach mentioned above with respect to network layer protocol or transmission type (e.g., RAT, copper, etc.) selection is discussed. In an example, the machine selection may be implemented by a learning engine, such that the choice of the RAT or network protocol use as a reinforcement learning problem.

For example, an inference engine—such as a spiking neural network or other artificial neural network—may be executed at both the network convergence shim 205 as well as at the RAT-convergence shim 210 to determine the network protocol and the physical layer RAT to be used for a given request. In an example, the two-inference engines may further interact with each other. Here, the choice of one element (e.g., RAT) may affect the choice of the other (e.g., ICN). For example, parameter restrictions—such as bandwidth, latency, or periodicity—at the physical layer (e.g., RAT) may affect the performance of the network layer protocols due to the inherent mechanisms, such as congestion control. To make these choices dependent upon one another within the inference engines, the output of one engine may be input to the other engine.

In an example, during learning, the two inference engines may be subject to a joint parameter regarding adjustments to the underlying engine. Thus, for example, the two engines may be subject to alternating gradient descent, or bilinear approaches when updating the weights of the inference engines.

Using the systems and techniques noted above, a node may effectively use either ICN or IP connections as the situation demands. Thus, for example, delivering named data between vehicles on the road may be more easily accomplished via an ICN connection. As noted above, such ease of data transfer may need to be tempered in certain situations. Below several techniques and systems are described to provide geographic location control for an ICN.

Figure 3:
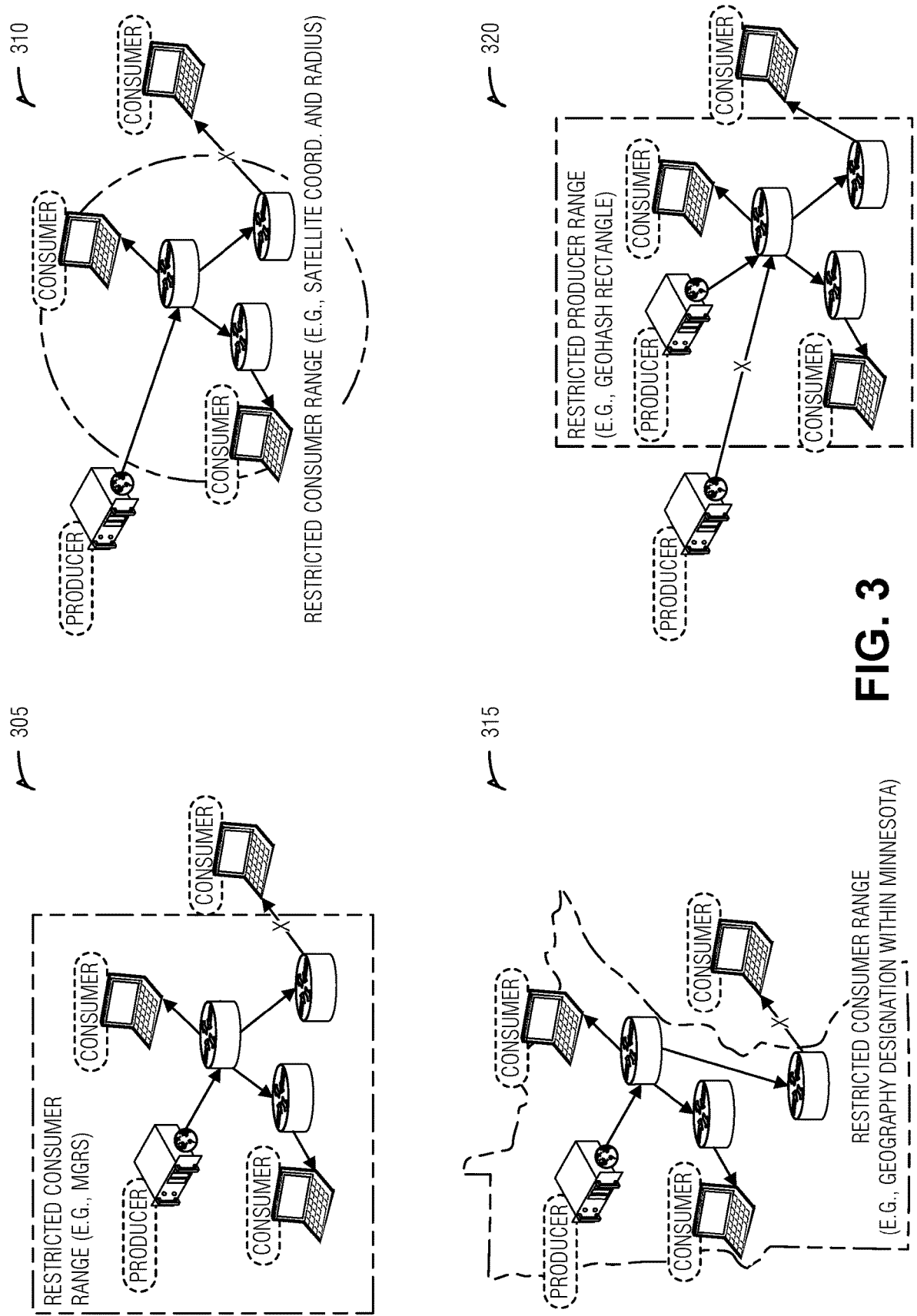
FIG. 3 illustrated examples of location restricted communications in an ICN, according to an embodiment.

FIG. 3 illustrated examples of location restricted communications in an ICN, according to an embodiment. Illustrated are several use cases and components (e.g., data consumers, routers, data producers, and a geographic area of interest) involved in these use cases. The illustrated use cases include a GPS location and a surrounding radius (use case 310), a rectangle specified with GPS or Military Grid Reference System (MRGS) coordinates (use case 305), a geographic feature—such as a country, state (e.g., Minnesota), county, city, etc.—explicitly defined by a map (use case 315), or some Geohash or other defined rectangles or some other addressing scheme (use case 320). For the first three examples, consumers within a specified geographic boundary may be able to receive the requested data while those outside the region are not, illustrated as a consumer with an 'X' in its connection to the network nodes. The fourth example use case 320, illustrates that data from producers within the Geohash are selected for interest forwarding while other producers (illustrated with an 'X' in its connection) are not used. Another geographic area addressing technique that may be used is What3Words, where any three-meter square surface area may be addressed using three words.

The following table, Table 1, illustrates some examples of ways in which how policy constraints may be expressed with data and interest packets:

| Method | Generator of Constraint | Example | Use Case |
|---|---|---|---|
| Transmit constraint in name in interest packets | Consumer | /myrectdata/Constraint/ LocationConstraintType= TWL/spec=1_Alpha+2_Alpha+3_Alpha | Consumer wants data only from a given geolocation Multiple consumers have the same constraint and may use the same Content Storage entry for name No issue with sending constraint in the name |
| Parameter field (NDN Example) of interest packet | Consumer | LocationConstraintType= TWL&spec=1_Alpha+2_Alpha+3_Alpha | Consumer wants data only from a given geolocation Issue with sending constraint in the name |
| Additional MetaInfo Field in Data Packet (NDN example) called Constraints | Producer | LocationConstraintType= TWL&spec=1_Alpha+2_Alpha+3_Alpha | Data producer wishes to constrain forwarding of data |

While URL-like notation is used for the parameter field in the interest packet and for the additional MetaInfo field in the data packet above, the notation may also be JavaScript Object Notation (JSON) or some other encapsulation.

The constraint mechanism is general enough to express non-location constraints or policies regarding variables such as time. However, in the context of location, there are several interesting variations. For example, there may be multiple ways for a data consumer to express location constraints. Selection of these techniques may depend on how effective name-based caching is and whether the name will reveal the constraints. The following table, Table 2, illustrates some examples of ways to embed location information into data or interest packets to describe the location of the producer or consumer. This information may be self-reported, leaving ICN routers to determine whether it is true. For example, an enclave protected environment on the producer or consumer may potentially be used to make this location determination more trusted.

| Packet Type | Role | Method |
|---|---|---|
| Interest | Consumer | Additional Parameter field called ConsumerLocation |
| Data | Producer | Additional MetaInfo field called ProducerLocation |

Figure 4A:
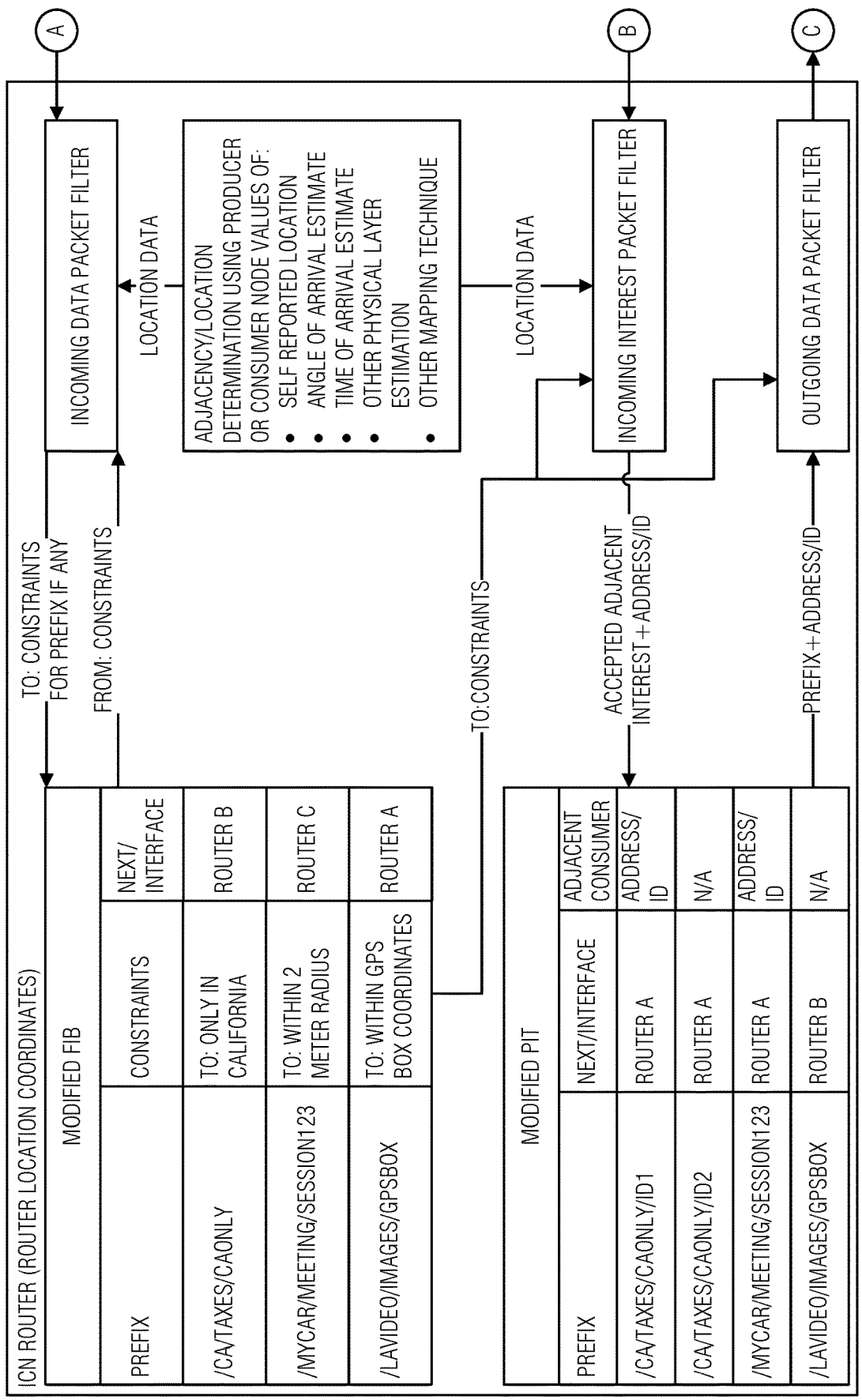
FIGS. 4A-4B illustrate an example of a router performing location filtering, according to an embodiment.
Figure 4B:
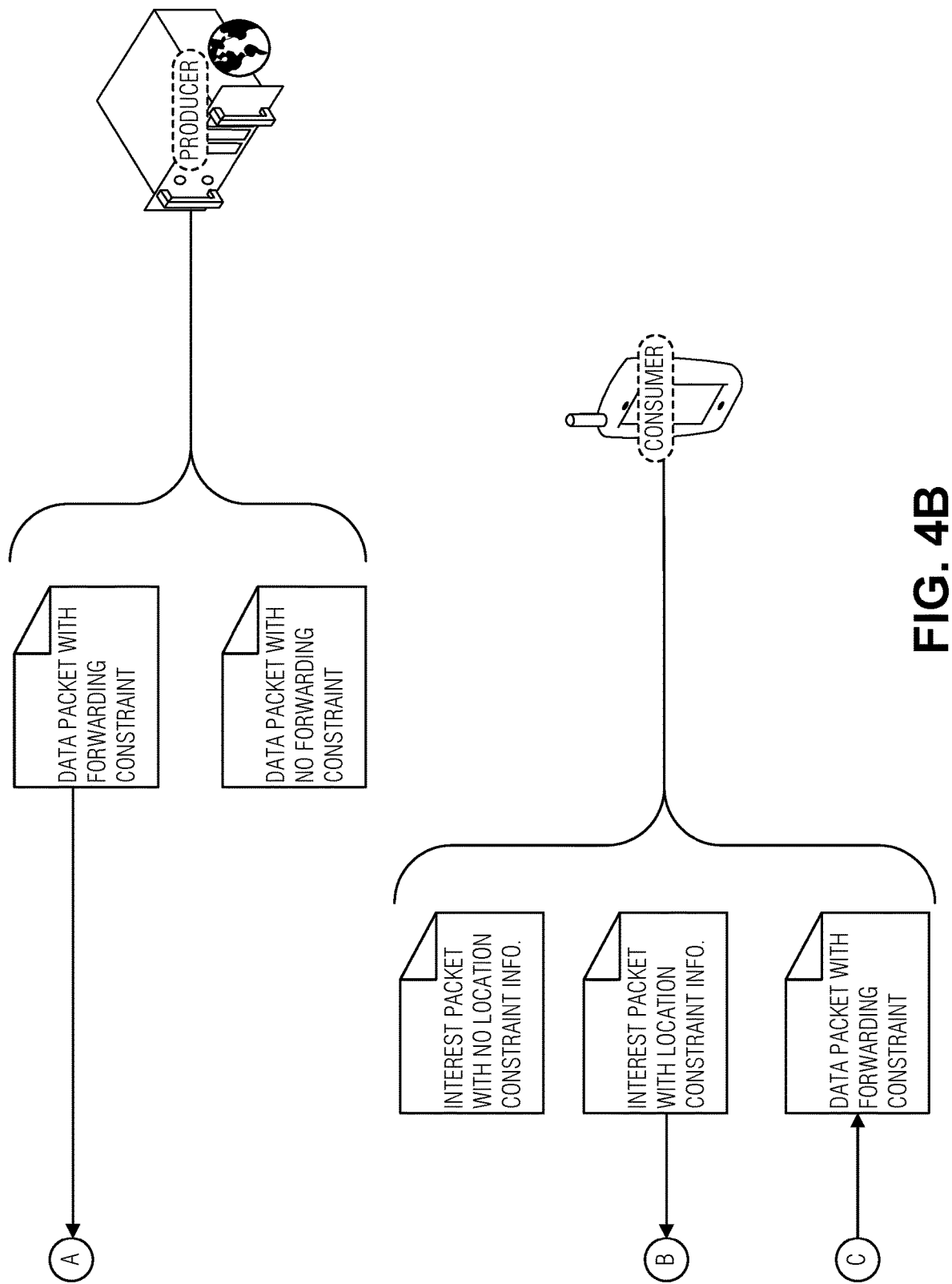

FIGS. 4A-4B illustrate an example of a router performing location filtering, according to an embodiment. Each router has its own physical location. The ICN FIB may be extended to contain location forwarding constraints or origin constraints for a prefix. Also, the PIT may have an additional column to contain the IDs or addresses of adjacent consumers to which the node may need to restrict data packets. Note that these features add geographical restriction information—or any other constraints—associated with the data to the content namespace when content is published. For instance, if content "/publisher1/documents/newspaper2" needs to be restricted only to the United States of America (U.S.), then that constraint is added to the namespace and published with the namespace. This implies that, if there is a request for "/publisher1/documents/newspaper1," there is no restriction and that the interest packet may be forwarded anywhere. During bootstrapping, the constraints associated with a namespace may be entered into the FIB in the new field dedicated for constraints. The longest prefix match will indicate that there is a restriction while routing the interest and data packets.

In operation, when a node receives an interest packet, the node first checks whether the sender is an adjacent consumer and meets the location constraints. For instance, when the node detects a restriction in the namespace, but determines that it is within the restricted area, the node does not perform the checks, thereby saving power and improving latency. However, when the restriction is published, if the node estimates that it is within the range of wireless transmissions to the edge—e.g., determined by the adjacency or location sensors or services, which may use a variety of techniques such as believing any self-reported location, using angle of arrival data, or other physical layer estimation techniques—the node marks that the constraint needs to be checked for each packet related to the namespace.

In an example, if the node is an edge node and cannot estimate its location, the node may refuse to forward packets for the restricted namespace and return a negative acknowledgment (NACK). If a node cannot determine its location and cannot get that information from other nodes, it may refuse to forward packets related to the restricted namespace. If an incoming interest packet is accepted from an adjacent consumer, the address or ID may be recorded in the PIT and the Interest forwarded.

Incoming data packets from producers may be handled in a similar fashion—e.g., a producer's physical relationship (e.g., inside, outside, on the edge) of a restricted area and whether it there are any "From" constraints on where the interest and data originate. Similarly, in the interest packet case, if the data for an interest restricts the area within which the router is located, those packets are dropped. Data that is excluded because of the producer's location is dropped and not forwarded.

In an example, consider a router bound for an adjacent consumer. Here, the router may check if there are any constraints on a name. If there is a constraint and the packet is bound for an adjacent consumer, the router may check whether any constraint applies. If the allowed location does not include the destination consumer, then the data packet is dropped. Otherwise, it is sent on to the adjacent consumer.

Figure 5:
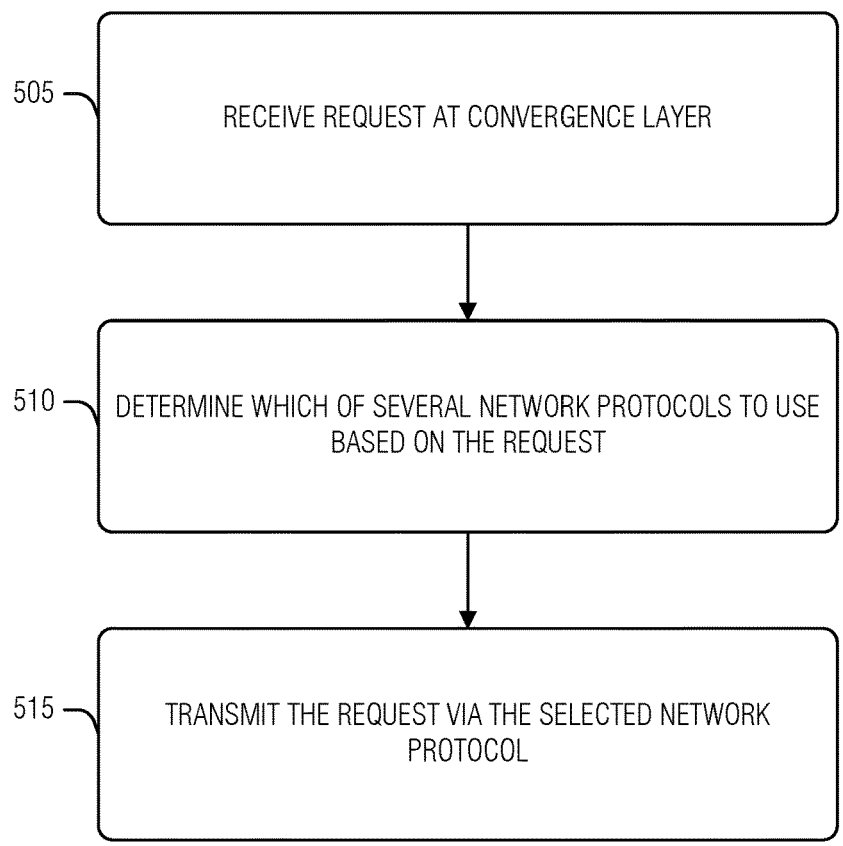
FIG. 5 is an example of a method for ICN coexistence with other networking paradigms, according to an embodiment.

FIG. 5 is an example of a method 500 for ICN coexistence with other networking paradigms, according to an embodiment. The operations of the method 500 are implemented in computing hardware, such as that described in FIG. 6 or 7 (e.g., processing circuitry).

At operation 505, a request, from an application on a node, is received at a convergence layer of the node. The request is delivered to the convergence layer via an API. Here, the API provides the entirety of the application's interface to the underlying network layers. Thus, for example, the API is universal with respect to what type of network (e.g., ICN or IP) to use. However, in an example, the API includes a flag, field, parameter, signal, etc., that enables the application to pass a hint to the convergence layer. Here, the hint is information that suggests that the convergence layer, or a lower network layer, use a parameter or field. In an example, the hint is mandatory. Mandatory hints, or directives, require a certain behavior. Thus, mandatory hints may be those that restrict packet delivery within a geographic area, while other hints may suggest that ICN would be more efficient than IP, but the convergence layer may still choose to use IP.

In an example, the hint characterizes the data in the request, or the data expected in the response. For example, the hint may suggest how the data may be split to use ICN for some portions and IP for other portions. In an example, the characterization of the data may be used to determine which of several network protocols to use. Thus, for example, the hint may suggest that the data is an image (which may suggest ICN for delivery) but is part of a session between two unchanging devices (which may suggest IP).

At operation 510, a network protocol of the several network protocols available to the node is selected to transmit the request. In an example, the several network protocols include ICN and IP. The selection of the network protocol may be based on a number of factors. Such factors may include the type of data being transmitted, the type of communication occurring (e.g., session based or content delivery), security concerns, geographic limitations on data transfer, network throughput—which may include congestion in wireless channels, bandwidth, poor signal strength, etc.—among other things. The selection may be based on a hierarchy, in which underlying physical media conditions (e.g., signal strength, bandwidth, latency, etc.) are selected first, and content efficiency for a given protocol are selected second. In an example, the network protocol and the physical layer choices are dependent. Here, a statistical landscape may be used in which parameters of the transmission (e.g., as acquired from analysis of the request or from hints) are dimensions in a space, and selections are a function in the space. Here, the parameters then provide a coordinate into the space and the function provides the selections.

In an example, an inference engine may be invoked to select the network protocol. The complexity and many possibly dependent variables from the request parameters to an optimal network layer selection lend themselves to inference engines, such as artificial neural networks. Here, the inference engine may be trained upon the available data that is extractable from the request and the network protocol choices to optimize for a number of factors, such as speed, latency, or network burden.

Although a single network may be used to select both the network protocol and an underlying physical transmission medium (e.g., RAT), in an example, a first network is used for the network protocol selection and a second network is used for the transportation medium select. In an example, the first inference engine and the second inference engine are trained together. Thus, the optimization dependencies between the two choices that may be optimized across both inference engines. In an example, the training uses an alternating convergence mechanism to adjust the inference engine and the second inference engine.

As noted above, the application may provide hints to the convergence layer. In an example, determining the network protocol includes using a hint from the application. Again, these hints may suggest aspects of the underlying network layers to use, such as a name space in ICN, may reveal the type of data (e.g., image, textual data, etc.), may reveal the type of communication (e.g., point-to-point session, streaming broadcast to a broad audience, etc.), and may require certain things (e.g., geographic restriction, minimum security, quality-of-service, etc.). In an example, the hint includes a splitting suggestion.

Although the splitting suggestion may simply include a division of the request that makes logical sense, enabling the convergence layer to, for example, use multiple RATs with smaller packet sizes to increase throughput, the splitting suggest may also include data types within the split. Thus, session-based data may be tagged, and static content may be tagged. This enables the convergence layer to use ICN, for example, to request and deliver the static content and IP to request and deliver the session-based information, increasing overall network efficiency.

In an example, where splitting has occurred between the request and the convergence layer prior to transmission, the convergence layer maintains a record, or embeds a code into the split packets, used to merge the multiple response into a single response. This single response may then be returned to the application via another API call (e.g., "GET-RESULT") or a return to the API call that spawned the request.

At operation 515, the request is transmitted via the network protocol. As noted above, geographic restriction may be important to a variety of application. Here, the ICN layer may be modified to enforce such a restriction at the ICN layer. Essentially, the restriction enforcement is a filter on forwarding interest packets or data packets. Thus, an ICN component, such as the node, ascertains its own position relative to the restriction and determines whether to transmit any given packet based on this relationship. Thus, in an example, an ICN packet may be created—in response to selecting ICN as the network protocol—that includes a geographic restriction in a name of the ICN packet. Here, the node may determine its position with respect to the geographic restriction and forward the ICN packet based on the position of the node with respect to the geographic restriction.

Figure 6:
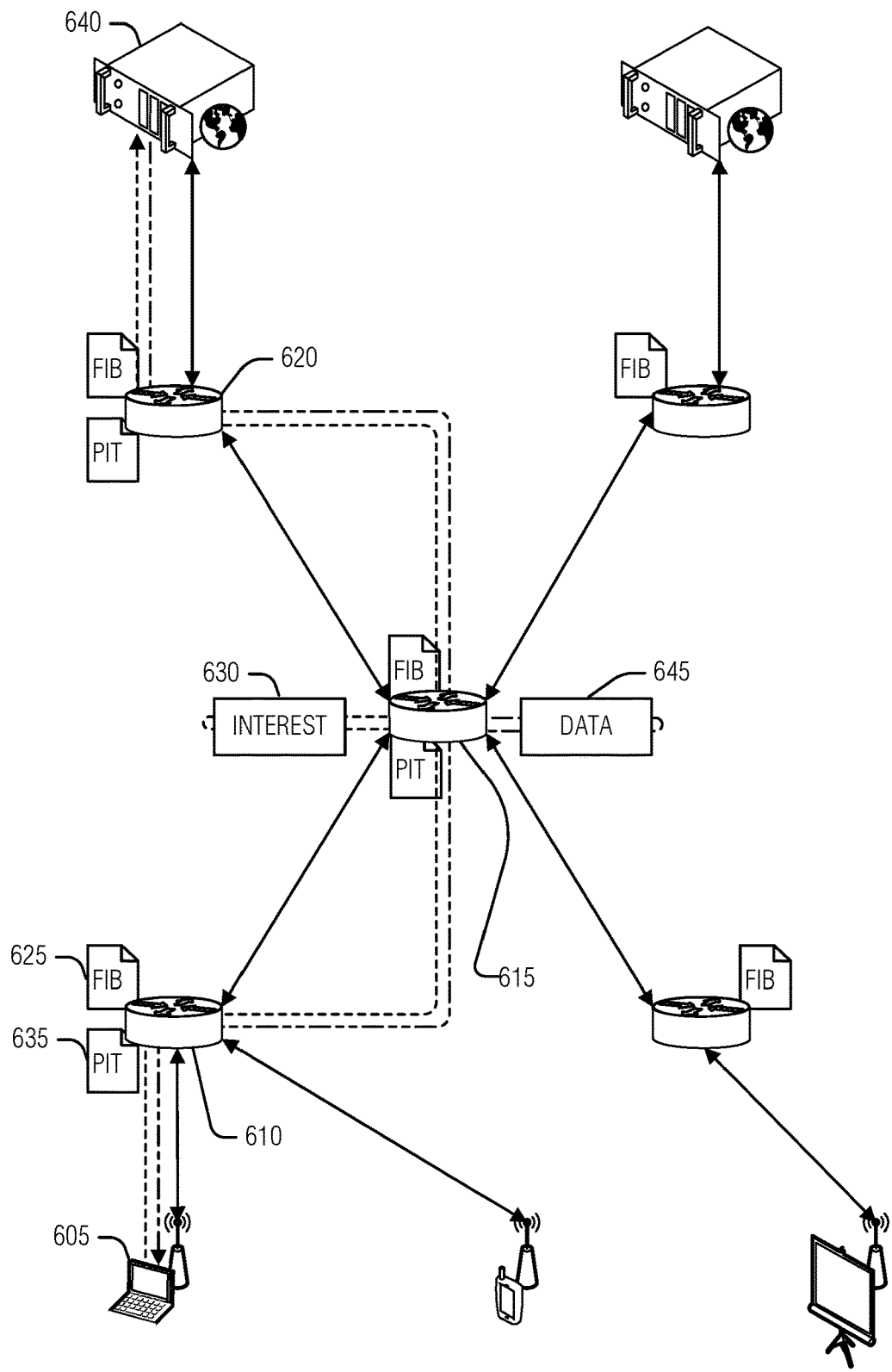
FIG. 6 illustrates an example ICN, according to an embodiment.
Figure 7:
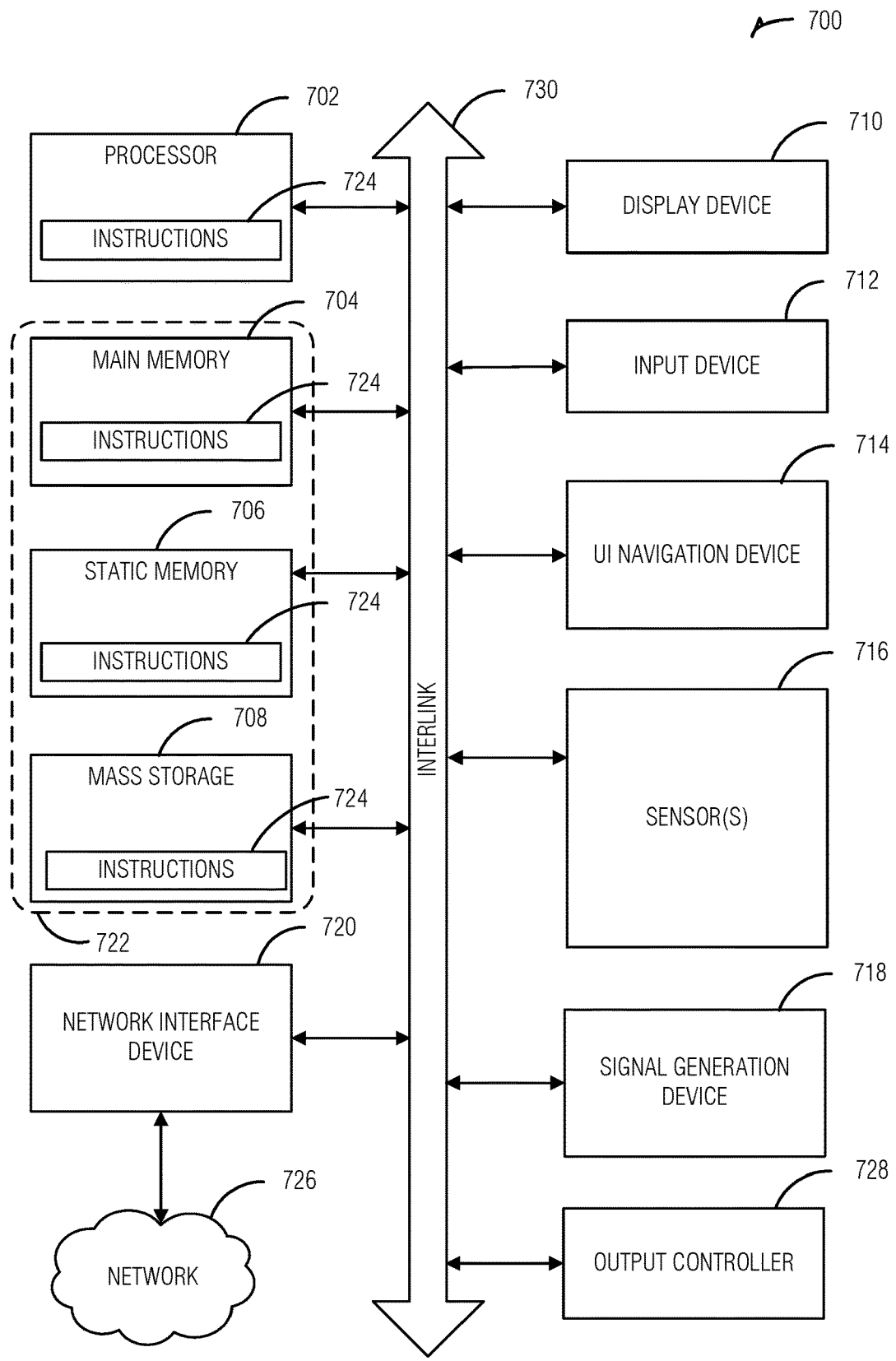
FIG. 7 is a block diagram illustrating an example of a machine upon which one or more embodiments may be implemented.

FIGS. 6 and 7 below provide additional details of the components in FIG. 1. For example, FIG. 6 illustrates several details and variations in ICNs. FIG. 7 illustrates several examples of computer hardware that may be used to implement any of the components illustrated in FIG. 1.

FIG. 6 illustrates an example ICN, according to an embodiment. ICNs operate differently than traditional host-based (e.g., address-based) communication networks. ICN is an umbrella term for a networking paradigm in which information itself is named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, a device 605 (e.g., subscriber) requests named content from the network itself. The content request may be called an interest and transmitted via an interest packet 630. As the interest packet traverses network devices (e.g., network elements, routers, switches, hubs, etc.)—such as network elements 610, 615, and 620—a record of the interest is kept, for example, in a pending interest table (PIT) at each network element. Thus, network element 610 maintains an entry in its PIT 635 for the interest packet 630, network element 615 maintains the entry in its PIT, and network element 620 maintains the entry in its PIT.

When a device, such as publisher 640, that has content matching the name in the interest packet 630 is encountered, that device 640 may send a data packet 645 in response to the interest packet 630. Typically, the data packet 645 is tracked back through the network to the source (e.g., device 605) by following the traces of the interest packet 630 left in the network element PITs. Thus, the PIT 635 at each network element establishes a trail back to the subscriber 605 for the data packet 645 to follow.

Matching the named data in an ICN may follow several strategies. Generally, the data is named hierarchically, such as with a universal resource identifier (URI). For example, a video may be named www.somedomain.com or videos or v8675309. Here, the hierarchy may be seen as the publisher, "www.somedomain.com," a sub-category, "videos," and the canonical identification "v8675309." As an interest 630 traverses the ICN, ICN network elements will generally attempt to match the name to a greatest degree. Thus, if an ICN element has a cached item or route for both "www.somedomain.com or videos" and "www.somedomain.com or videos or v8675309," the ICN element will match the later for an interest packet 630 specifying "www.somedomain.com or videos or v8675309." In an example, an expression may be used in matching by the ICN device. For example, the interest packet may specify "www-.somedomain.com or videos or v8675*" where '*' is a wildcard. Thus, any cached item or route that includes the data other than the wildcard will be matched.

Item matching involves matching the interest 630 to data cached in the ICN element. Thus, for example, if the data 645 named in the interest 630 is cached in network element 615, then the network element 615 will return the data 645 to the subscriber 605 via the network element 610. However, if the data 645 is not cached at network element 615, the network element 615 routes the interest 630 on (e.g., to network element 620). To facilitate routing, the network elements may use a forwarding information base 625 (FIB) to match named data to an interface (e.g., physical port) for the route. Thus, the FIB 625 operates much like a routing table on a traditional network device.

In an example, additional meta-data may be attached to the interest packet 630, the cached data, or the route (e.g., in the FIB 625), to provide an additional level of matching. For example, the data name may be specified as "www.somedomain.com or videos or v8675309," but also include a version number—or timestamp, time range, endorsement, etc. In this example, the interest packet 630 may specify the desired name, the version number, or the version range. The matching may then locate routes or cached data matching the name and perform the additional comparison of metadata or the like to arrive at an ultimate decision as to whether data or a route matches the interest packet 630 for respectively responding to the interest packet 630 with the data packet 645 or forwarding the interest packet 630.

ICN has advantages over host-based networking because the data segments are individually named. This enables aggressive caching throughout the network as a network element may provide a data packet 630 in response to an interest 630 as easily as an original author 640. Accordingly, it is less likely that the same segment of the network will transmit duplicates of the same data requested by different devices.

Fine grained encryption is another feature of many ICN networks. A typical data packet 645 includes a name for the data that matches the name in the interest packet 630. Further, the data packet 645 includes the requested data and may include additional information to filter similarly named data (e.g., by creation time, expiration time, version, etc.). To address malicious entities providing false information under the same name, the data packet 645 may also encrypt its contents with a publisher key or provide a cryptographic hash of the data and the name. Thus, knowing the key (e.g., from a certificate of an expected publisher 640) enables the recipient to ascertain whether the data is from that publisher 640. This technique also facilitates the aggressive caching of the data packets 645 throughout the network because each data packet 645 is self-contained and secure. In contrast, many host-based networks rely on encrypting a connection between two hosts to secure communications. This may increase latencies while connections are being established and prevents data caching by hiding the data from the network elements.

Example ICN networks include: content centric networking (CCN)—as specified in the Internet Engineering Task Force (IETF) draft specifications for CCNx 0.x and CCN 1.x; named data networking (NDN)—as specified in the NDN technical report DND-0001; Data-Oriented Network Architecture (DONA)—as presented at proceedings of the 2007 Association for Computing Machinery's (ACM) Special Interest Group on Data Communications (SIGCOMM) conference on Applications, technologies, architectures, and protocols for computer communications; Named Functions Networking (NFN); 4WARD; Content Aware Searching, Retrieval and Streaming (COAST); Convergence of Fixed and Mobile Broadband Access/Aggregation Networks (COMBO); Content Mediator Architecture for Content-Aware Networks (COMET); CONVERGENCE; GreenICN; Network of Information (NetInf); IP Over ICN (POINT); Publish-Subscribe Internet Routing Paradigm (PSIRP); Publish Subscribe Internet Technology (PURSUIT); Scalable and Adaptive Internet Solutions (SAIL); Universal, Mobile-Centric and Opportunistic Communications Architecture (UMOBILE); among others.

FIG. 7 illustrates a block diagram of an example machine 700 upon which any one or more of the techniques (e.g., methodologies) discussed herein may perform. Examples, as described herein, may include, or may operate by, logic or a number of components, or mechanisms in the machine 700. Circuitry (e.g., processing circuitry) is a collection of circuits implemented in tangible entities of the machine 700 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 700 follow.

In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 700 may include a hardware processor 702 (e.g., a central processing unit (CPU), a graphics processing unit (GPU), a hardware processor core, or any combination thereof), a main memory 704, a static memory (e.g., memory or storage for firmware, microcode, a basic-input-output (BIOS), unified extensible firmware interface (UEFI), etc.) 706, and mass storage 708 (e.g., hard drive, tape drive, flash storage, or other block devices) some or all of which may communicate with each other via an interlink (e.g., bus) 730. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 708, a signal generation device 718 (e.g., a speaker), a network interface device 720, and one or more sensors 716, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 702, the main memory 704, the static memory 706, or the mass storage 708 may be, or include, a machine readable medium 722 on which is stored one or more sets of data structures or instructions 724 (e.g., software) embodying or utilized by any one or more of the techniques or functions described herein. The instructions 724 may also reside, completely or at least partially, within any of registers of the processor 702, the main memory 704, the static memory 706, or the mass storage 708 during execution thereof by the machine 700. In an example, one or any combination of the hardware processor 702, the main memory 704, the static memory 706, or the mass storage 708 may constitute the machine readable media 722. While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may be further transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software. A transmission medium is a machine readable medium.

ADDITIONAL NOTES & EXAMPLES

Example 1 is a device for information centric network (ICN) interworking, the device comprising: processing circuitry; and a memory including instructions that, when executed, configure the processing circuitry to: receive a request at a convergence layer of a node, the request originating at an application; determine a network protocol of several network protocols to use to transmit the request; and transmit the request via the network protocol.

In Example 2, the subject matter of Example 1, wherein the convergence layer provides at least one of flow control or of congestion control to the several network protocols.

In Example 3, the subject matter of any of Examples 1-2, comprising an interface to collect measurement information from at least a physical layer or a media access (MAC) layer.

In Example 4, the subject matter of any of Examples 1-3, wherein, to determine the network protocol, the instructions configure the processing circuitry to invoke an inference engine to select the network protocol.

In Example 5, the subject matter of Example 4, wherein, to transmit the request, the instructions configure the processing circuitry to use a second inference engine to select a transportation medium.

In Example 6, the subject matter of Example 5, wherein the inference engine and the second inference engine are trained together, using an alternating convergence mechanism to adjust the inference engine and the second inference engine.

In Example 7, the subject matter of any of Examples 1-6, wherein the several network protocols include ICN and Internet protocol (IP).

In Example 8, the subject matter of any of Examples 1-7, wherein, to determine the network protocol, the instructions configure the processing circuitry to use a hint from the application.

In Example 9, the subject matter of Example 8, wherein the hint includes a splitting suggestion.

In Example 10, the subject matter of Example 9, wherein the splitting suggestion includes splitting the request over more than one network protocol.

In Example 11, the subject matter of any of Examples 9-10, wherein, to transmit the request, the instructions configure the processing circuitry to split the request into multiple packets.

In Example 12, the subject matter of Example 11, wherein the multiple packets are redundant over several network protocols.

In Example 13, the subject matter of any of Examples 11-12, wherein the instructions configure the processing circuitry to: merge multiple responses to the multiple packets into a single response; and deliver the single response to the application.

In Example 14, the subject matter of any of Examples 1-13, wherein, to transmit the request, the instructions configure the processing circuitry to create an ICN packet in response to selecting ICN as the network protocol.

In Example 15, the subject matter of Example 14, wherein the ICN packet includes a geographic restriction in a name of the ICN packet.

In Example 16, the subject matter of Example 15, wherein the instructions configure the processing circuitry to: determine a position of the node with respect to the geographic restriction; and forward the ICN packet based on the position of the node with respect to the geographic restriction.

Example 17 is a method for information centric network (ICN) interworking, the method comprising: receiving a request at a convergence layer of a node, the request originating at an application; determining a network protocol of several network protocols to use to transmit the request; and transmitting the request via the network protocol.

In Example 18, the subject matter of Example 17, wherein the convergence layer provides at least one of flow control or of congestion control to the several network protocols.

In Example 19, the subject matter of any of Examples 17-18, wherein the node includes an interface to collect measurement information from at least a physical layer or a media access (MAC) layer.

In Example 20, the subject matter of any of Examples 17-19, wherein determining the network protocol includes invoking an inference engine to select the network protocol.

In Example 21, the subject matter of Example 20, wherein transmitting the request includes using a second inference engine to select a transportation medium.

In Example 22, the subject matter of Example 21, wherein the inference engine and the second inference engine are trained together, using an alternating convergence mechanism to adjust the inference engine and the second inference engine.

In Example 23, the subject matter of any of Examples 17-22, wherein the several network protocols include ICN and Internet protocol (IP).

In Example 24, the subject matter of any of Examples 17-23, wherein determining the network protocol includes using a hint from the application.

In Example 25, the subject matter of Example 24, wherein the hint includes a splitting suggestion.

In Example 26, the subject matter of Example 25, wherein the splitting suggestion includes splitting the request over more than one network protocol.

In Example 27, the subject matter of any of Examples 25-26, wherein transmitting the request includes splitting the request into multiple packets.

In Example 28, the subject matter of Example 27, wherein the multiple packets are redundant over several network protocols.

In Example 29, the subject matter of any of Examples 27-28, comprising: merging multiple responses to the multiple packets into a single response; and delivering the single response to the application.

In Example 30, the subject matter of any of Examples 17-29, wherein transmitting the request includes creating an ICN packet in response to selecting ICN as the network protocol.

In Example 31, the subject matter of Example 30, wherein the ICN packet includes a geographic restriction in a name of the ICN packet.

In Example 32, the subject matter of Example 31, comprising: determining a position of the node with respect to the geographic restriction; and forwarding the ICN packet based on the position of the node with respect to the geographic restriction.

Example 33 is at least one machine-readable medium including instructions for information centric network (ICN) interworking, the instructions, when executed by processing circuitry, cause the processing circuitry to perform operations comprising: receiving a request at a convergence layer of a node, the request originating at an application; determining a network protocol of several network protocols to use to transmit the request; and transmitting the request via the network protocol.

In Example 34, the subject matter of Example 33, wherein the convergence layer provides at least one of flow control or of congestion control to the several network protocols.

In Example 35, the subject matter of any of Examples 33-34, wherein the node includes an interface to collect measurement information from at least a physical layer or a media access (MAC) layer.

In Example 36, the subject matter of any of Examples 33-35, wherein determining the network protocol includes invoking an inference engine to select the network protocol.

In Example 37, the subject matter of Example 36, wherein transmitting the request includes using a second inference engine to select a transportation medium.

In Example 38, the subject matter of Example 37, wherein the inference engine and the second inference engine are trained together, using an alternating convergence mechanism to adjust the inference engine and the second inference engine.

In Example 39, the subject matter of any of Examples 33-38, wherein the several network protocols include ICN and Internet protocol (IP).

In Example 40, the subject matter of any of Examples 33-39, wherein determining the network protocol includes using a hint from the application.

In Example 41, the subject matter of Example 40, wherein the hint includes a splitting suggestion.

In Example 42, the subject matter of Example 41, wherein the splitting suggestion includes splitting the request over more than one network protocol.

In Example 43, the subject matter of any of Examples 41-42, wherein transmitting the request includes splitting the request into multiple packets.

In Example 44, the subject matter of Example 43, wherein the multiple packets are redundant over several network protocols.

In Example 45, the subject matter of any of Examples 43-44, wherein the operations comprise: merging multiple responses to the multiple packets into a single response; and delivering the single response to the application.

In Example 46, the subject matter of any of Examples 33-45, wherein transmitting the request includes creating an ICN packet in response to selecting ICN as the network protocol.

In Example 47, the subject matter of Example 46, wherein the ICN packet includes a geographic restriction in a name of the ICN packet.

In Example 48, the subject matter of Example 47, wherein the operations comprise: determining a position of the node with respect to the geographic restriction; and forwarding the ICN packet based on the position of the node with respect to the geographic restriction.

Example 49 is a system for information centric network (ICN) interworking, the system comprising: means for receiving a request at a convergence layer of a node, the request originating at an application; means for determining a network protocol of several network protocols to use to transmit the request; and means for transmitting the request via the network protocol.

In Example 50, the subject matter of Example 49, wherein the convergence layer provides at least one of flow control or of congestion control to the several network protocols.

In Example 51, the subject matter of any of Examples 49-50, wherein the node includes an interface to collect measurement information from at least a physical layer or a media access (MAC) layer.

In Example 52, the subject matter of any of Examples 49-51, wherein the means for determining the network protocol include means for invoking an inference engine to select the network protocol.

In Example 53, the subject matter of Example 52, wherein the means for transmitting the request include means for using a second inference engine to select a transportation medium.

In Example 54, the subject matter of Example 53, wherein the inference engine and the second inference engine are trained together, using an alternating convergence mechanism to adjust the inference engine and the second inference engine.

In Example 55, the subject matter of any of Examples 49-54, wherein the several network protocols include ICN and Internet protocol (IP).

In Example 56, the subject matter of any of Examples 49-55, wherein the means for determining the network protocol includes using a hint from the application.

In Example 57, the subject matter of Example 56, wherein the hint includes a splitting suggestion.

In Example 58, the subject matter of Example 57, wherein the splitting suggestion includes splitting the request over more than one network protocol.

In Example 59, the subject matter of any of Examples 57-58, wherein the means for transmitting the request include means for splitting the request into multiple packets.

In Example 60, the subject matter of Example 59, wherein the multiple packets are redundant over several network protocols.

In Example 61, the subject matter of any of Examples 59-60, comprising: means for merging multiple responses to the multiple packets into a single response; and means for delivering the single response to the application.

In Example 62, the subject matter of any of Examples 49-61, wherein the means for transmitting the request include means for creating an ICN packet in response to selecting ICN as the network protocol.

In Example 63, the subject matter of Example 62, wherein the ICN packet includes a geographic restriction in a name of the ICN packet.

In Example 64, the subject matter of Example 63, comprising: means for determining a position of the node with respect to the geographic restriction; and means for forwarding the ICN packet based on the position of the node with respect to the geographic restriction.

Example 65 is at least one machine-readable medium including instructions that, when executed by processing circuitry, cause the processing circuitry to perform operations to implement of any of Examples 1-64.

Example 66 is an apparatus comprising means to implement of any of Examples 1-64.

Example 67 is a system to implement of any of Examples 1-64.

Example 68 is a method to implement of any of Examples 1-64.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A device for information centric network (ICN) interworking, the device comprising:
    processing circuitry; and
    a memory including instructions that, when executed, configure the processing circuitry to:
        receive a request at a convergence layer of a node, the request originating at an application, the convergence layer positioned between an application layer containing the application and network layers;

determine a network protocol of several network protocols to use to transmit the request, wherein, to determine the network protocol, the instructions configure the processing circuitry to invoke an artificial neural network (ANN) on context and measurement information to select the network protocol; and transmit the request via the network protocol.

2. The device of claim 1, wherein the ANN is a spiking neural network.

3. The device of claim 1, wherein, to transmit the request, the instructions configure the processing circuitry to use a second ANN to select a transportation medium.

4. The device of claim 1, wherein, to determine the network protocol, the instructions configure the processing circuitry to use a hint from the application.

5. The device of claim 4, wherein the hint includes a splitting suggestion o split a single packet of the request into several packets.

6. The device of claim 1, wherein, to transmit the request, the instructions configure the processing circuitry to create an ICN packet in response to selecting ICN as the network protocol.

7. The device of claim 6, wherein the ICN packet includes a geographic restriction in a name of the ICN packet.

8. The device of claim 7, wherein the instructions configure the processing circuitry to:

determine a position of the node with respect to the geographic restriction; and forward the ICN packet based on the position of the node with respect to the geographic restriction.

9. A method for information centric network (ICN) interworking, the method comprising:

receiving a request at a convergence layer of a node, the request originating at an application, the convergence layer positioned between an application layer containing the application and network layers;

determining a network protocol of several network protocols to use to transmit the request, wherein determining the network protocol includes invoking an artificial neural network (ANN) on context and measurement information to select the network protocol; and transmitting the request via the network protocol.

10. The method of claim 9, wherein the ANN is a spiking neural network.

11. The method of claim 9, wherein transmitting the request includes using a second ANN to select a transportation medium.

12. The method of claim 9, wherein determining the network protocol includes using a hint from the application.

13. The method of claim 12, wherein the hint includes a splitting suggestion to split a single packet of the request into several packets.

14. The method of claim 9, wherein transmitting the request includes creating an ICN packet in response to selecting ICN as the network protocol.

15. The method of claim 14, wherein the ICN packet includes a geographic restriction in a name of the ICN packet.

16. The method of claim 15, comprising:

determining a position of the node with respect to the geographic restriction; and forwarding the ICN packet based on the position of the node with respect to the geographic restriction.

17. At least one non-transitory machine-readable medium including instructions for information centric network (ICN) interworking, the instructions, when executed by processing circuitry, cause the processing circuitry to perform operations comprising:

receiving a request at a convergence layer of a node, the request originating at an application, the convergence layer positioned between an application layer containing the application and network layers;

determining a network protocol of several network protocols to use to transmit the request, wherein determining the network protocol includes invoking an artificial neural network (ANN) on context and measurement information to select the network protocol; and transmitting the request via the network protocol.

18. The at least one non-transitory machine-readable medium of claim 17, wherein the ANN is a spiking neural network.

19. The at least one non-transitory machine-readable medium of claim 17, wherein transmitting the request includes using a second ANN to select a transportation medium.

20. The at least one non-transitory machine-readable medium of claim 17, wherein determining the network protocol includes using a hint from the application.

21. The at least one non-transitory machine-readable medium of claim 20, wherein the hint includes a splitting suggestion to split a single packet of the request into several packets.

22. The at least one non-transitory machine-readable medium of claim 17, wherein transmitting the request includes creating an ICN packet in response to selecting ICN as the network protocol.

23. The at least one non-transitory machine-readable medium of claim 22, wherein the ICN packet includes a geographic restriction in a name of the ICN packet.

24. The at least one non-transitory machine-readable medium of claim 23, wherein the operations comprise:

determining a position of the node with respect to the geographic restriction; and forwarding the packet based on the position of the node with respect to the geographic restriction.

\* \* \* \* \*

UNITED STATES PATENT AND TRADEMARK OFFICE
CERTIFICATE OF CORRECTION

| | |
|---|---|
| PATENT NO. | : 11,979,315 B2 |
| APPLICATION NO. | : 16/456687 |
| DATED | : May 7, 2024 |
| INVENTOR(S) | : Alam et al. |

Page 1 of 1

It is certified that error appears in the above-identified patent and that said Letters Patent is hereby corrected as shown below:

In the Claims

In Column 21, Line 17, in Claim 5, delete "o" and insert --to-- therefor

In Column 22, Line 51, in Claim 24, before "packet", insert --ICN--

Signed and Sealed this
Seventh Day of October, 2025

John A. Squires
*Director of the United States Patent and Trademark Office*